United States Patent
Pedrazzoli

(10) Patent No.: US 6,990,913 B2
(45) Date of Patent: Jan. 31, 2006

(54) MULCHING PROCESS

(75) Inventor: Alberto Pedrazzoli, Reggio Emilia (IT)

(73) Assignee: Maxver S.R.L., San Cesario Su Panaro (Modena) (IT)

( * ) Notice: Subject to any disclaimer, the term of this patent is extended or adjusted under 35 U.S.C. 154(b) by 0 days.

(21) Appl. No.: 10/504,716

(22) PCT Filed: Feb. 7, 2003

(86) PCT No.: PCT/EP03/01241

§ 371 (c)(1),
(2), (4) Date: Aug. 16, 2004

(87) PCT Pub. No.: WO03/068891

PCT Pub. Date: Aug. 21, 2003

(65) Prior Publication Data

US 2005/0081767 A1    Apr. 21, 2005

(30) Foreign Application Priority Data

Feb. 14, 2002 (IT) .......................... MI2002A0295

(51) Int. Cl.
*A01G 13/02* (2006.01)
*C09K 17/30* (2006.01)
*C09K 17/52* (2006.01)

(52) U.S. Cl. .................... 111/200; 111/900; 47/1.01 F; 47/32.3; 47/66.7; 47/58.1 LS; 47/DIG. 10; 521/905; 521/914

(58) Field of Classification Search ................ 111/200, 111/900, 915, 919; 47/1.01 R, 1.01 F, 32.3, 47/20.1, 65, 66.7, 73–78, 58.1 R, 58.1 LS, 47/58.1 SC, DIG. 10; 521/174, 905, 914
See application file for complete search history.

(56) References Cited

U.S. PATENT DOCUMENTS

| 3,805,531 A | | 4/1974 | Kistner | |
|---|---|---|---|---|
| 4,241,537 A | * | 12/1980 | Wood | ............................. 47/77 |
| 6,032,412 A | * | 3/2000 | Bohne et al. | ............ 47/58.1 R |

FOREIGN PATENT DOCUMENTS

| WO | WO 98 01510 | 1/1998 |
|---|---|---|
| WO | WO 01 39593 | 6/2001 |

* cited by examiner

Primary Examiner—Christopher J. Novosad
(74) Attorney, Agent, or Firm—Young & Thompson

(57) ABSTRACT

The soil mulching process, includes the following stages: mixing together at least two liquid starting substances able to react together to give rise, within a determined time period, to an inert solid final substance while still in the liquid state, pouring the obtained mixture onto the soil surface in a quantity such as to obtain on the soil surface, when the reaction between the components is complete, a layer of the solid substance of a thickness which prevents light passage through it.

5 Claims, No Drawings

MULCHING PROCESS

BACKGROUND OF THE INVENTION

The present invention relates to a soil mulching process, i.e. the covering of a determined soil surface with various materials to prevent infesting grasses or plants from growing on said surface.

As is well known to the expert of the art, mulching is used in agriculture and gardening to prevent the growth of weeds around cultivated plants, at least within a determined distance.

The following are currently used for mulching:
cellulose discs in multiple layers;
black polyethylene film;
synthetic or natural fibre fabrics;
shredded conifer bark;
miscellaneous shredded bark;
shredded pruning waste.

In the USA in particular, the mulching process is carried out using road tankers containing shredded conifer bark and provided with a pump enabling this material to be dispensed by flexible hoses of suitable diameter.

All known mulching processes have however a common drawback, namely their high cost, which limits their use. This drawback is due not only to the intrinsic cost of the material used for mulching, but also to the fact that as this material is light it is voluminous, so that transport costs are high.

The object of the present invention is to obviate this drawback by providing a mulching process of decidedly lower cost.

SUMMARY OF THE INVENTION

This object is attained by the mulching process of the present invention, comprising the following stages:
  mixing together at least two liquid starting substances able to react together to give rise, within a determined time period, to an inert solid final substance;
  while still in the liquid state, arranging the obtained mixture onto the soil surface in a quantity such as to obtain on the soil surface, when the reaction between the components is complete, a layer of said solid substance of a thickness which substantially prevents light passage through it.

It should be noted that the term "liquid substance" indicates herein not only a true liquid substance, but also a foam or paste.

It should further be noted that the term "final solid substance" means a substance which, if not subjected to specific mechanical action, maintains its own form, so that a spongy and/or elastic substance also falls within this definition.

Returning to the process of the present invention, this can comprise further stages consisting for example of adding to one of the liquid starting substances or to their mixture while still in the liquid state a dye which gives the final solid substance the desired colour.

DETAILED DESCRIPTION OF THE PREFERRED EMBODIMENTS

Starting substances suitable for this purpose are for example the hydrophilic polyurethane prepolymers obtained by reacting polyols with diisocyanates, to be reacted, by mixing them together, with compounds containing active hydrogen (such as water, alcohols or amines), to obtain the desired inert substance on completion of poymerization. Substances which have proved suitable for this purpose are for example the prepolymers produced by the DOW CHEMICAL COMPANY known by the trademark HYPOL, which give rise to a final spongy solid substance.

These prepolymers also present the advantage of allowing the addition of additives or active ingredients directly during their mixing with the other reacting substance (conveniently water).

Polymerization is normally complete in about 5–10 minutes.

The use of the aforesaid prepolymers presents the following advantages:
  a final solid substance is obtained which is permeable to air and water, with considerable advantage to the cultivated plants around which mulching is carried out;
  the starting substances are easy to obtain and cost less than the substance currently used for mulching;
  the solid final substance is not toxic either to man, animals or plants;
  the liquid mixture can be administered to the soil by equipment provided with a spray gun, similar to that used in the building industry to form thermally insulating layers on walls, floors and roofs;
  the solid final substance adheres perfectly to the soil contour, penetrating a few centimetres into it to form a single entity with the soil;
  suitable dyes (for example dark coloured dyes to prevent passage of the sun's rays or to give the final solid substance a colour similar to that of the soil) can be directly and easily added to the still liquid mixture.

It should be noted that the mulching process of the present invention is also conveniently applicable to outdoor potted plants. The liquid mixture needs simply to be sprayed or poured directly onto the surface of the mould contained in the pot.

It should also be noted that by virtue of the process of the present invention, the mulch can be made to adhere to the base of the plant, so preventing the growth of weed tufts around its base (which instead happens when using for example polyethylene film, cellulose discs or fabric, in which a cross-shaped cut is made in correspondence with the plant, a weed tuft normally emerging from this cut with the passage of time).

To verify the feasibility and convenience of the process of the invention, using equipment employed in the building industry to form insulated layers and provided with a gun enabling two liquid components to be mixed together and sprayed, a mixture of 600 grams of Hypol and an equal volume of water was sprayed onto a soil surface measuring 27×48 cm. After about 7 minutes, on the surface of the soil a spongy layer was obtained having an average thickness of 2 cm, and permeable to air and water. The entire operation, from its initiation to spraying, took no more than 60 seconds. This thickness proved sufficient to prevent weed growth, even without the use of dyes.

What is claimed is:

1. A soil mulching process, comprising the following stages:
  mixing together at least two liquid starting substances able to react together to give rise, within a determined time period, to an inert solid final substance;
  while still in the liquid state, arranging the obtained mixture onto the soil surface in a quantity such as to obtain on the soil surface, when the reaction between the components is complete, a layer of said solid substance of a thickness which substantially prevents light passage through said solid substance;

wherein two of the liquid starting substances are a hydrophilic polyurethane prepolymer obtained, by reacting polyols with diisocyanates, and a compound containing active hydrogen.

2. A soil mulching process as claimed in claim 1, comprising a further stage consisting of adding to one of the liquid starting substances or to their mixture a dye which gives the final solid substance a color.

3. A soil mulching process as claimed in claim 1, wherein the compound containing active hydrogen is water.

4. A soil mulching process as claimed in claim 1, wherein the liquid mixture is administered to the soil by a spray gun.

5. A soil mulching process as claimed in claim 1, wherein in the case of potted plants, the mulching is carried out on the surface of the mold contained in the pot.

* * * * *